(12) United States Patent
Chang et al.

(10) Patent No.: US 10,816,715 B2
(45) Date of Patent: Oct. 27, 2020

(54) LIGHT GUIDE PLATE, BACKLIGHT MODULE AND DISPLAY DEVICE

(71) Applicants: Radiant(Guangzhou) Opto-Electronics Co., Ltd, Guangzhou, Guangdong (CN); Radiant Opto-Electronics Corporation, Kaohsiung (TW)

(72) Inventors: Chia-Yin Chang, Kaohsiung (TW); Chin-Ting Weng, Kaohsiung (TW); Hao Chen, Kaohsiung (TW); Yi-Ching Chung, Kaohsiung (TW)

(73) Assignees: RADIANT (GUANGZHOU) OPTO-ELECTRONICS CO., LTD., Guangzhou, Guangdong (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 120 days.

(21) Appl. No.: 16/232,150

(22) Filed: Dec. 26, 2018

(65) Prior Publication Data
US 2019/0129086 A1 May 2, 2019

Related U.S. Application Data

(63) Continuation of application No. PCT/CN2017/107761, filed on Oct. 26, 2017.

(51) Int. Cl.
*F21V 8/00* (2006.01)

(52) U.S. Cl.
CPC .......... *G02B 6/0036* (2013.01); *G02B 6/0015* (2013.01); *G02B 6/0061* (2013.01); *G02B 6/0038* (2013.01); *G02B 6/0068* (2013.01)

(58) Field of Classification Search
CPC .. G02B 6/0036; G02B 6/0016; G02B 6/0061; G02B 6/0068; G02B 6/0038
See application file for complete search history.

(56) References Cited

U.S. PATENT DOCUMENTS

| | | | |
|---|---|---|---|
| 6,454,452 | B1 | 9/2002 | Sasagawa et al. |
| 6,767,106 | B2 | 7/2004 | Barnes et al. |

(Continued)

FOREIGN PATENT DOCUMENTS

| | | |
|---|---|---|
| CN | 1854862 A | 11/2006 |
| CN | 102829393 A | 12/2012 |

(Continued)

*Primary Examiner* — Peggy A Neils
(74) *Attorney, Agent, or Firm* — McClure, Qualey & Rodack, LLP

(57) ABSTRACT

A light guide plate, a backlight module and a display device are provided. The light guide plate includes a main body and plural prism portions. The main body has a first extending direction and a second extending direction. The main body includes a light-incident surface extending along the first extending direction and an optical surface connected to the light-incident surface. The optical surface has a first region, a second region and a third region which are arranged along the second extending direction. The prism portions are disposed on the optical surface and extend along the second extending direction. An occupied area ratio of the prism portions located in the first region is greater than an occupied area ratio of the prism portions located in the second region and is smaller than an occupied area ratio of the prism portions located in the third region.

13 Claims, 10 Drawing Sheets

(56) References Cited

U.S. PATENT DOCUMENTS

| | | | |
|---|---|---|---|
| 6,854,855 B2 | 2/2005 | Munro et al. | |
| 7,588,365 B2 * | 9/2009 | Katsumata | G02B 6/0043 |
| | | | 362/623 |
| 7,777,833 B2 * | 8/2010 | Hwang | G02B 6/0063 |
| | | | 349/61 |
| 8,186,867 B2 * | 5/2012 | Chen | G02B 6/0036 |
| | | | 362/623 |
| 9,632,231 B2 | 4/2017 | Zhou | |
| 2009/0128906 A1 | 5/2009 | Stiens et al. | |
| 2015/0346414 A1 | 12/2015 | Chang et al. | |
| 2017/0285244 A1 | 10/2017 | Yoshida | |

FOREIGN PATENT DOCUMENTS

| | | |
|---|---|---|
| CN | 103424801 A | 12/2013 |
| CN | 104049296 A | 9/2014 |
| CN | 104375236 A | 2/2015 |
| CN | 105137522 A | 12/2015 |
| CN | 105929479 A | 9/2016 |
| CN | 106802447 A | 6/2017 |
| CN | 206489292 U | 9/2017 |
| CN | 207301397 U | 5/2018 |
| JP | 2017147432 A | 8/2017 |
| JP | 2017188250 A | 10/2017 |
| TW | 546520 B | 8/2003 |
| TW | I356925 B | 1/2012 |
| WO | 2007143372 A2 | 12/2007 |

\* cited by examiner

LIGHT GUIDE PLATE, BACKLIGHT MODULE AND DISPLAY DEVICE

RELATED APPLICATIONS

This application is a continuation application of International Application No. PCT/CN2017/107761 filed on Oct. 26, 2017, which is incorporated herein by reference.

BACKGROUND

Field of Invention

The present invention relates to a light guide element and its applications. More particularly, the present invention relates to a light guide plate and its applications to a backlight module and a display device.

Description of Related Art

A conventional light guide plate has a light-incident surface, a light-emitting surface and a reflecting surface. Light generated by a light source enters the light guide plate from the light-incident surface and is emitted out from the light-emitting surface of the light guide plate. In order to mix the light passing through the light guide plate uniformly, microstructures are generally disposed on the light-emitting surface or the reflecting surface of the light guide plate. Conventional microstructures show a linear trend of distribution, in which the microstructures are relatively sparse at a light-incident side of the light guide plate, and become increasingly dense towards an opposite side away from the light-incident side of the light guide plate. However, the linear trend of distribution is likely to result in the generation of bright and dark lines at the light-incident side of the light guide plate and affect optical appearance of the light guide plate. Hence, there is need to develop a light guide plate to overcome the foregoing problems.

SUMMARY

One object of the present invention is to provide a light guide plate, a backlight module and display device, the light guide plate has plural prism structures which can be used to control light emitted amount from different positions of the light guide plate, so as to increase light-emitting uniformity and the overall light-emitting appearance of the backlight module and display device.

According to the aforementioned objects, a light guide plate is provided. The light guide plate includes a main body and plural prism portions. The main body has a first extending direction and a second extending direction vertical to the first extending direction. The main body includes a light-incident surface and an optical surface. The light-incident surface extends along the first extending direction. The optical surface is connected to the light-incident surface. The optical surface has a first side edge near the light-incident surface and a second side edge away from the light-incident surface, in which the second extending direction is parallel to a direction extending from the first side edge towards the second side edge. The optical surface has a first region, a second region and a third region which are arranged along the second extending direction. The prism portions are disposed on the optical surface, in which each of the prism portions extends along the second extending direction. An occupied area ratio of a first portion of the prism portions located in the first region is greater than an occupied area ratio of a second portion of the prism portions located in the second region, and is smaller than an occupied area ratio of a third portion of the prism portions located in the third region.

According to an embodiment of the present invention, each of the prism portions has a first width located in the first region, a second width located in the second region and a third width located in the third region. The first width is greater than the second width, and the first width is smaller than the third width.

According to an embodiment of the present invention, each of the prism portions is formed from plural prism structures arranged along the second extending direction. Each of the first portion of the prism structures located in the first region has a first width, each of the second portion of the prism structures located in the second region has a second width, and each of the third portion of the prism structures located in the third region has a third width. The first width is greater than the second width, and the first width is smaller than the third width.

According to an embodiment of the present invention, each of the prism portions is formed from plural prism structures arranged along the second extending direction. An arrangement density of the prism structures which are located in the first region is greater than an arrangement density of the prism structures which are located in the second region and is smaller than an arrangement density of the prism structures which are located in the third region.

According to an embodiment of the present invention, each of the prism portions is formed from plural prism structures arranged along the second extending direction. There is a first distance between any two adjacent prism structures which are located in the first region along the second extending direction. There is a second distance between any two adjacent prism structures which are located in the second region along the second extending direction, and there is a third distance extending along the second extending direction between any two adjacent prism structures which are located in the third region. The second distance is greater than the first distance, and the first distance is greater than the third distance.

According to an embodiment of the present invention, each of the prism portions is formed from plural prism structures arranged along the second extending direction. The prism structures are continuously connected together.

According to an embodiment of the present invention, the light guide plate further includes plural light-mixing structures disposed on the optical surface, in which the light-mixing structures are located between the first side edge and the first region.

According to an embodiment of the present invention, each of the prism portions is formed from plural prism structures arranged along the second extending direction. Each of the prism structures includes a first optical surface and a second optical surface. The first optical surface is inclined towards the light-incident surface, in which the first optical surface extends from a bottom portion to a top portion of each of the prism structures, and a first inclined angle is included between the first optical surface and a level surface passing through a bottom portion of the first optical surface. The second optical surface is inclined towards the light-incident surface, in which the second optical surface extends from the bottom portion to the top portion of each of the prism structures, and a second inclined angle is included between the second optical surface and a level surface passing through a bottom portion of the second optical surface. The first optical surface is near the light-incident surface, and the second optical surface is away from the light-incident surface.

According to an embodiment of the present invention, the first optical surface and the second optical surface of each of the prism structures are connected to form a ridge line which is substantially parallel to the first side edge.

According to an embodiment of the present invention, each of the prism portions is formed from plural prism structures arranged along the second extending direction. Each of the prism structures includes a first optical surface and a second optical surface. The first optical surface is inclined towards the light-incident surface, in which the first optical surface extends from a top portion to a bottom portion of each of the prism structures, and a first inclined angle is included between the first optical surface and a level surface passing through a top portion of the first optical surface. The second optical surface is inclined towards the light-incident surface, in which the second optical surface extends from the top portion to the bottom portion of each of the prism structures, and a second inclined angle is included between the second optical surface and a level surface passing through a top portion of the second optical surface. The first optical surface is near the light-incident surface, and the second optical surface is away from the light-incident surface.

According to an embodiment of the present invention, the first optical surface and the second optical surface of each of the prism structures are connected to form a valley line which is substantially parallel to the first side edge.

According to the aforementioned objects, a backlight module is provided. The backlight module includes the aforementioned light guide plate and a light source. The light source is disposed adjacent to the light-incident surface of the light guide plate.

According to the aforementioned objects, a display device is provided. The display device includes the aforementioned backlight module and a display panel. The display panel is disposed in front of the backlight module.

According to the aforementioned embodiments of the present invention, the light guide plate of the present invention has plural prism portions, in which occupied area ratio of the prism portions located near the light-incident surface of the light guide plate, located away from the light-incident surface (i.e. a surface opposite to the light-incident surface) of the light guide plate, and located at a middle portion of the light guide plate are different, such that the light emitted amounts from different positions of the light guide plate can be controlled, thus increasing the luminance uniformity of the light guide plate.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
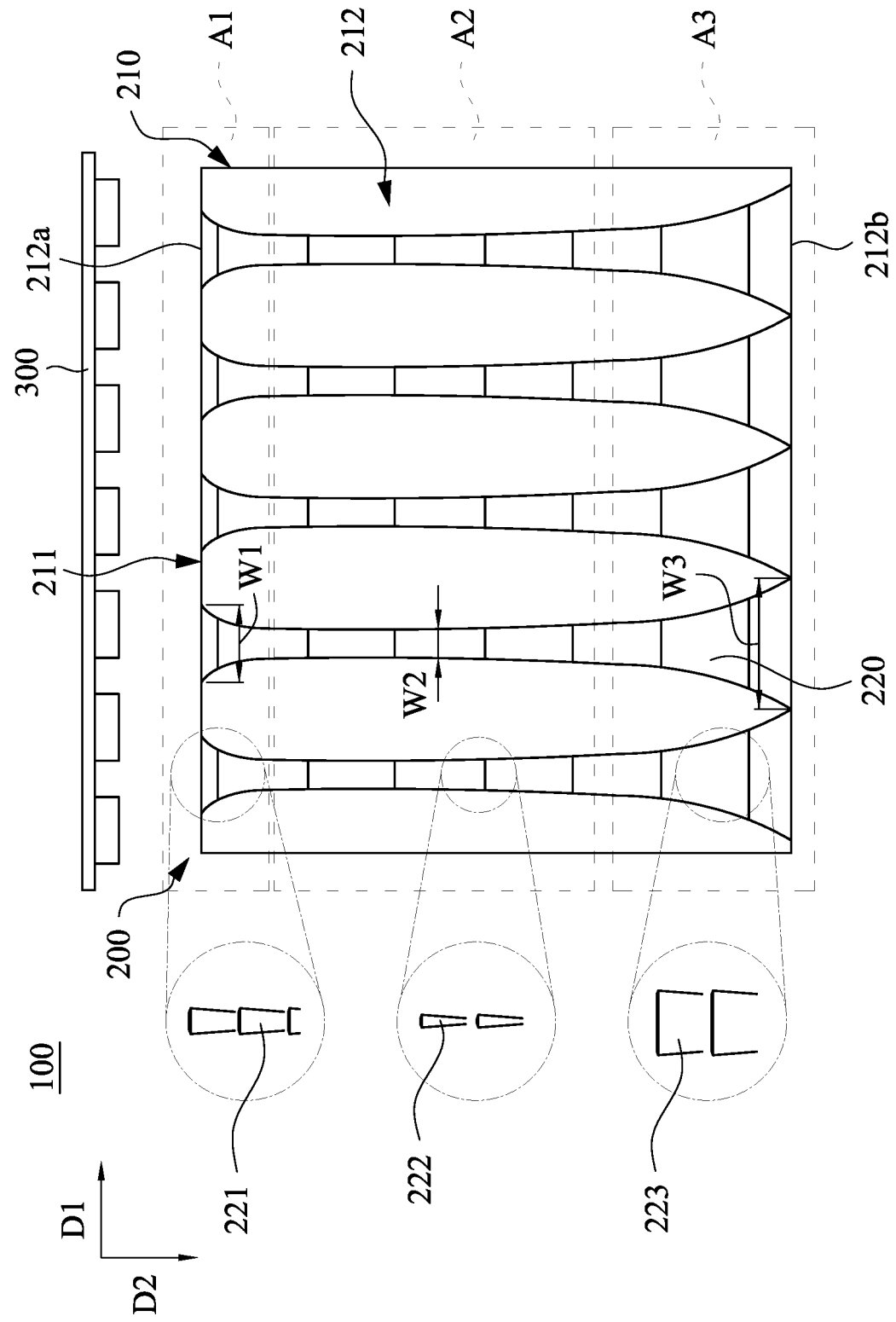
FIG. 1A is a schematic structural diagram showing a backlight module in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1A, FIG. 1A is a schematic structural diagram showing a backlight module 100 in accordance with a first embodiment of the present invention. The backlight module 100 of the present embodiment mainly includes a light guide plate 200 and a light source 300. The light guide plate 200 includes a main body 210 and plural prism portions 220. The prism portions 220 are disposed on the main body 210 for adjusting optical trends and increasing luminance uniformity of the light guide plate 200.

Referring to FIG. 1A again, in the light guide plate 200, the main body 210 is a transparent plate or another equivalent transparent element. In the present embodiment, the main body 210 has a first extending direction D1 and a second extending direction D2, and the first extending direction D1 is vertical to the second extending direction D2. In addition, the main body 210 includes a light-incident surface 211 and an optical surface 212. The light-incident surface 211 extends along the first extending direction D1, and the optical surface 212 is connected to the light-incident surface 211. In the present embodiment, the optical surface 212 is a light-emitting surface. In other embodiments, the optical surface 212 is a light reflecting surface. The light source 300 is disposed adjacent to the light-incident surface 211, and light generated from the light source 300 will enter the light guide plate 200 from the light-incident surface 211.

In one embodiment, the optical surface 212 has a first side edge 212a and a second side edge 212b opposite to the first side edge 212a. The first side edge 212a is near the light-incident surface 211, and the second side edge 212b is away from the light-incident surface 211. The second extending direction D2 is parallel to a direction extending from the first side edge 212a towards the second side edge 212b. In one embodiment, the optical surface 212 has a first region A1, a second region A2 and a third region A3 arranged along the second extending direction D2. It is noted that, the dashed frames of FIG. 1A are merely used for indicating the first region A1, the second region A2 and the third region A3, and are not parts of the light guide plate 200.

Figure 1B:
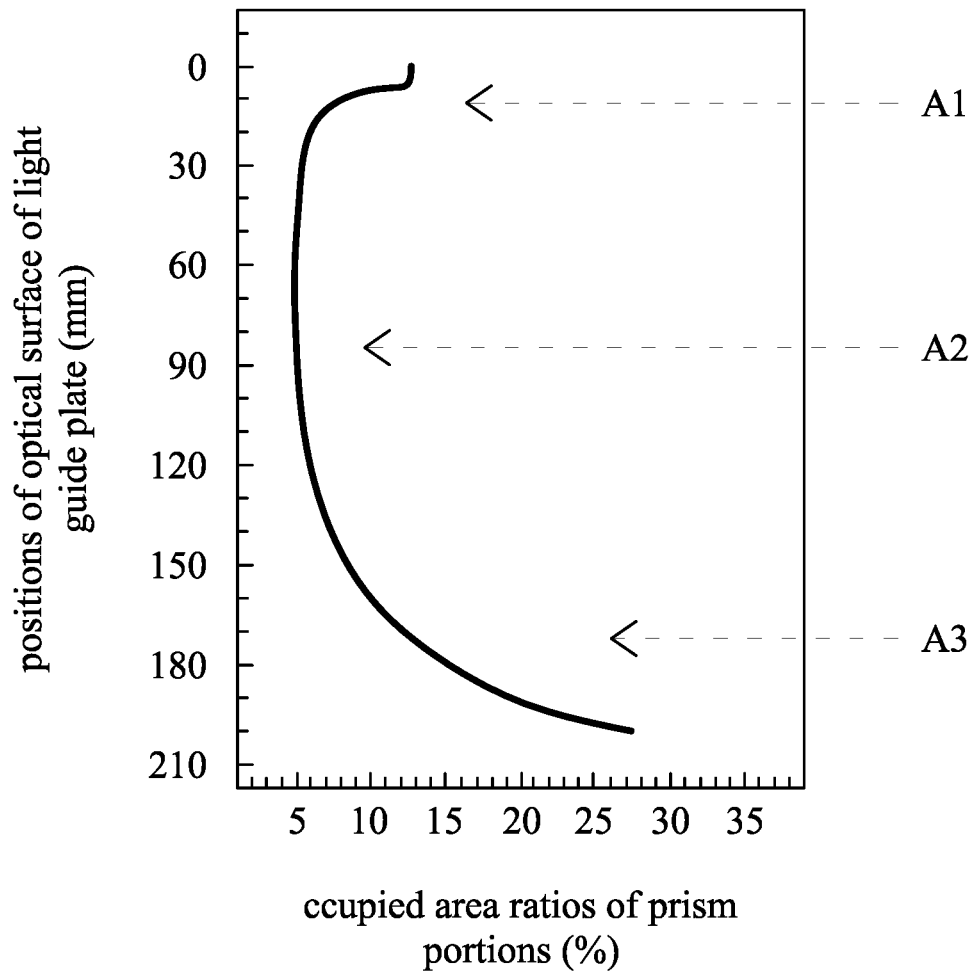
FIG. 1B is a schematic diagram showing occupied area ratios of prism portions located at different positions of an optical surface of a light guide plate to the optical surface of the light guide plate.

Referring to FIG. 1A again, the prism portions 220 are disposed on the optical surface 212. In the present embodiment, each of the prism portions 220 extends along the second extending direction D2 and extends across the first region A1, the second region A2 and the third region A3. Referring to FIG. 1B, FIG. 1B is a schematic diagram showing occupied area ratios of prism portions 220 located at different positions of the optical surface 212 of the light guide plate to the optical surface 212 of the light guide plate 200. In FIG. 1B, "0 mm" in the vertical axis represents a connecting portion between the optical surface 212 and the light-incident surface 211, and the a value in the vertical axis increases as the prism portion is located farther away from the light-incident surface 211. As shown in FIG. 1A and FIG. 1B, an occupied area ratio of a first portion of the prism portions 220 located in the first region A1 is greater than an occupied area ratio of a second portion of the prism portions 220 located in the second region A2, and is smaller than an occupied area ratio of a third portion of the prism portions 220 located in the third region A3. Therefore, after light generated from the light source 300 enters the light guide plate 200 from the light-incident surface 211, amount of light respectively emitted through the first portion of the prism portions 220 located in the first region A1, through the second portion of the prism portions 220 located in the second region A2 and through the third portion of the prism portions 220 located third region A3 are different, thereby increasing luminance uniformity of the optical surface 212.

In one embodiment, each of the prism portions 220 has a first width W1, a second width W2 and a third width W3. A portion of each of the prism portions 220 having the first width W1 is located in the first region A1, a portion of each of the prism portions 220 having the second width W2 is located in the second region A2, and a portion of each of the prism portions 220 having the third width W3 is located in the region A3. The first width W1 is greater than the second width W2, and the first width W1 is smaller than the third width W3, so that the occupied area ratio of the prism portions 220 located in the first region A1 is greater than the occupied area ratio of the prism portions 220 located in the second region A2 and is smaller than the occupied area ratio of the prism portions 220 located in the third region A3. It is noted that, the "first width W1", the "second width W2" and the "third width W3" described herein are respectively defined as a greatest width of each of the prism portions 220 located in the first region A1, a greatest width of each of the prism portions 220 located in the second region A2 and a greatest width of each of the prism portions 220 located in the third region A3.

Figure 2A:
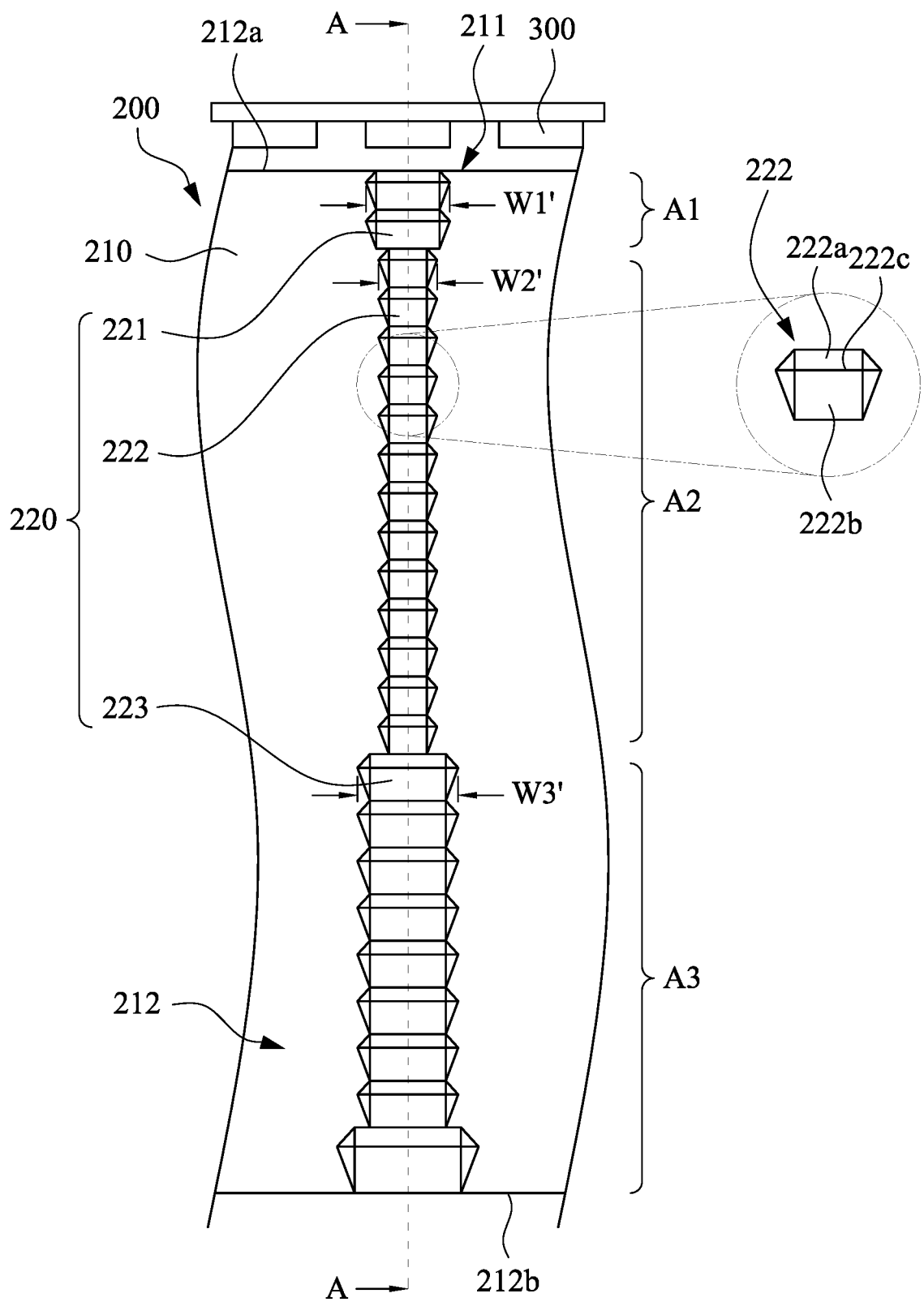
FIG. 2A is a schematic partial structural diagram showing a backlight module in accordance with the first embodiment of the present invention.
Figure 2B:
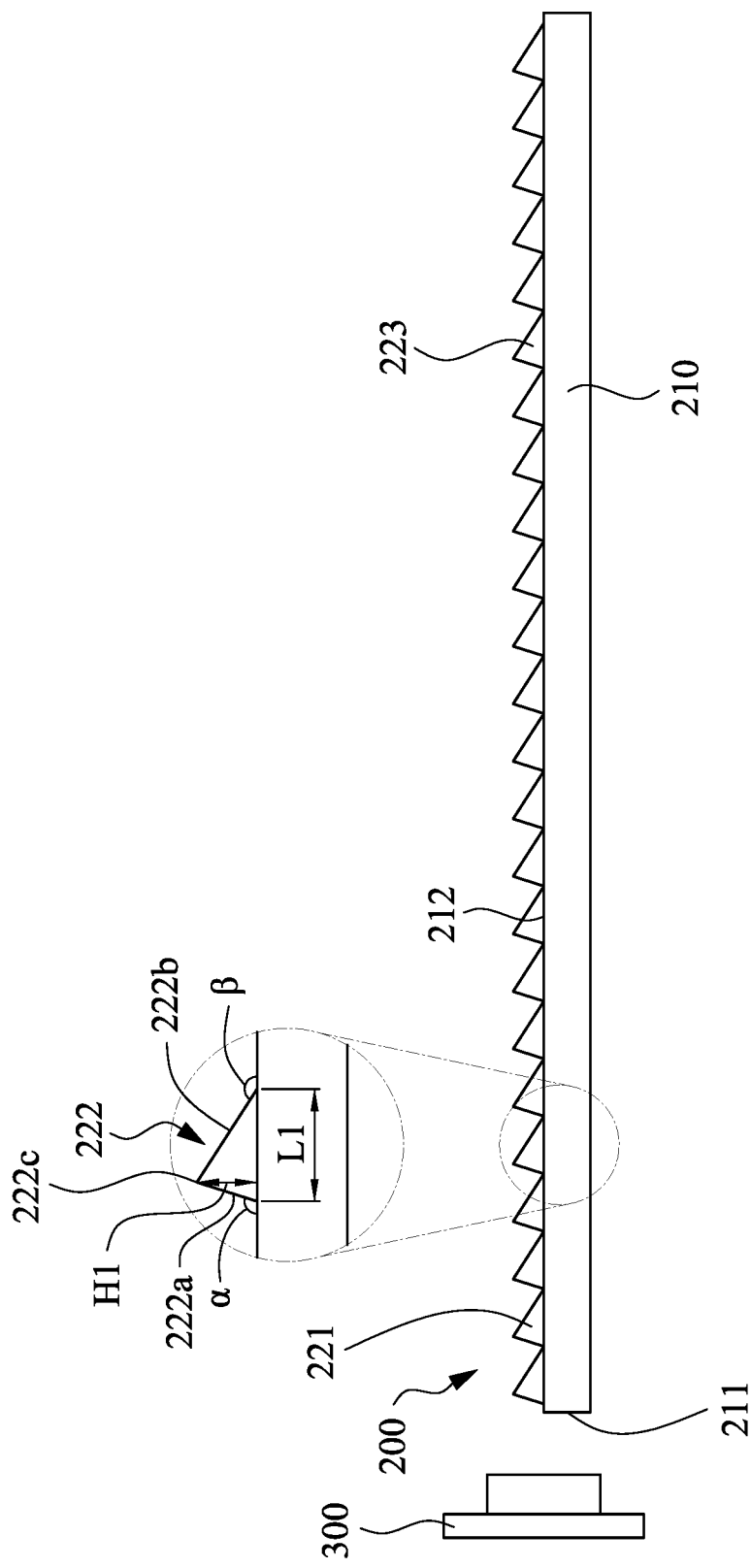
FIG. 2B is a schematic cross-sectional view taken along line A-A in FIG. 2A.

Referring to FIG. 1A again, in the present embodiment, each of the prism portions 220 is formed from plural prism structures (such as prism structures 221, prism structures 222 and prism structures 223) arranged along the second extending direction D2. The prism structures 221 are located in the first region A1, the prism structures 222 are located in the second region A2, and the prism structures 223 are located in the third region A3. Referring to FIG. 2A and FIG. 2B, FIG. 2A is a schematic partial structural diagram showing a backlight module in accordance with the first embodiment of the present invention, and FIG. 2B is a schematic cross-sectional view taken along line A-A in FIG. 2A. In the present embodiment, the prism structures 221, the prism structures 222 and the prism structures 223 are continuously connected together along the second extending direction D2. In the present embodiment, the prism structures 221, the prism structures 222 and the prism structures 223 are convex structures and have a same length L1 and a same height H1. Moreover, the structures of the prism structures 221, the prism structures 222 and the prism structures 223 are similar, and the main difference therebetween is that a first width W1' of the prism structures 221, a second width W2' of the prism structures 222 and a third width W3' of the prism structures 223 are different, thereby forming different sizes of the prism structures 221, the prism structures 222 and the prism structures 223.

Referring to FIG. 2A and FIG. 2B again, in the present embodiment, the first width W1' is greater than the second width W2', and the first width W1' is smaller than the third width W3', thereby forming an occupied area ratio of the prism structures 221 located in the first region A1 which is greater than an occupied area ratio of the prism structures 222 located in the second region A2 and is smaller than an occupied area ratio of the prism structures 223 located in the third region A3. Therefore, after light generated from the light source 300 enters the light guide plate 200 from the light-incident surface 211, the light emitted amount through the prism structures 221 located near the light-incident surface 211 is increased obviously, thereby overcoming the bright and dark band problem occurring at a light-incident side of the conventional light guide plate, thus enhancing the luminance uniformity of the optical surface 212 of the light guide plate 200.

In one example, each of the prism structures 222 includes a first optical surface 222a and a second optical surface 222b, in which the first optical surface 222a is near the light-incident surface 211, and the second optical surface 222b is away from the light-incident surface 211. The first optical surface 222a is connected to the optical surface 212 and is inclined with respect to the light-incident surface 211 so as to form a first inclined angle α. It is noted that, the first optical surface 222a extends from a bottom portion to a top portion of each of the prism structures 222, and the first inclined angle α is an included angle between the first optical surface 222a and a level surface passing through a bottom portion of the first optical surface 222a, in which the level surface and the optical surface 212 are on a same plane.

The second optical surface 222b is connected to the optical surface 212 and the first optical surface 222a. The second optical surface 222b is inclined with respect to the light-incident surface 211 so as to form a second inclined angle β. It is noted that, the second optical surface 222b extends from the bottom portion to the top portion of each of the prism structures 222, and the second inclined angle β is an included angle between the second optical surface 222b and a level surface passing through a bottom portion of the second optical surface 222b, in which the level surface and the optical surface 212 are on a same plane. The first optical surface 222a and the second optical surface 222b of each of the prism structures 222 are connected to form a ridge line 222c, and the ridge line 222c is substantially parallel to the first side edge 212a of the optical surface 212. In some embodiments, as shown in FIG. 2B, the first inclined angle α is smaller than the second inclined angle β, and the first inclined angle α faces towards the light-incident surface 211, and the second inclined angle β faces backwards the light-incident surface 211. In the present embodiment, the first optical surface 222a and the second optical surface 222b are mainly used to change light-emitting direction of light emitted from the prism structures 222. It is noted that, the designs of the prism structures 221 in the first region A1 and the prism structures 223 in the third region A3 on the light guide plate 700 are similar to the design of the prism structures 222, and each of the prism structures 221 and the prism structures 223 also has a first optical surface and a second optical surface respectively inclined with respect to the light-incident surface 211 so as to achieve the objective of changing light directivity, and therefore will not be described again herein.

Figure 3:
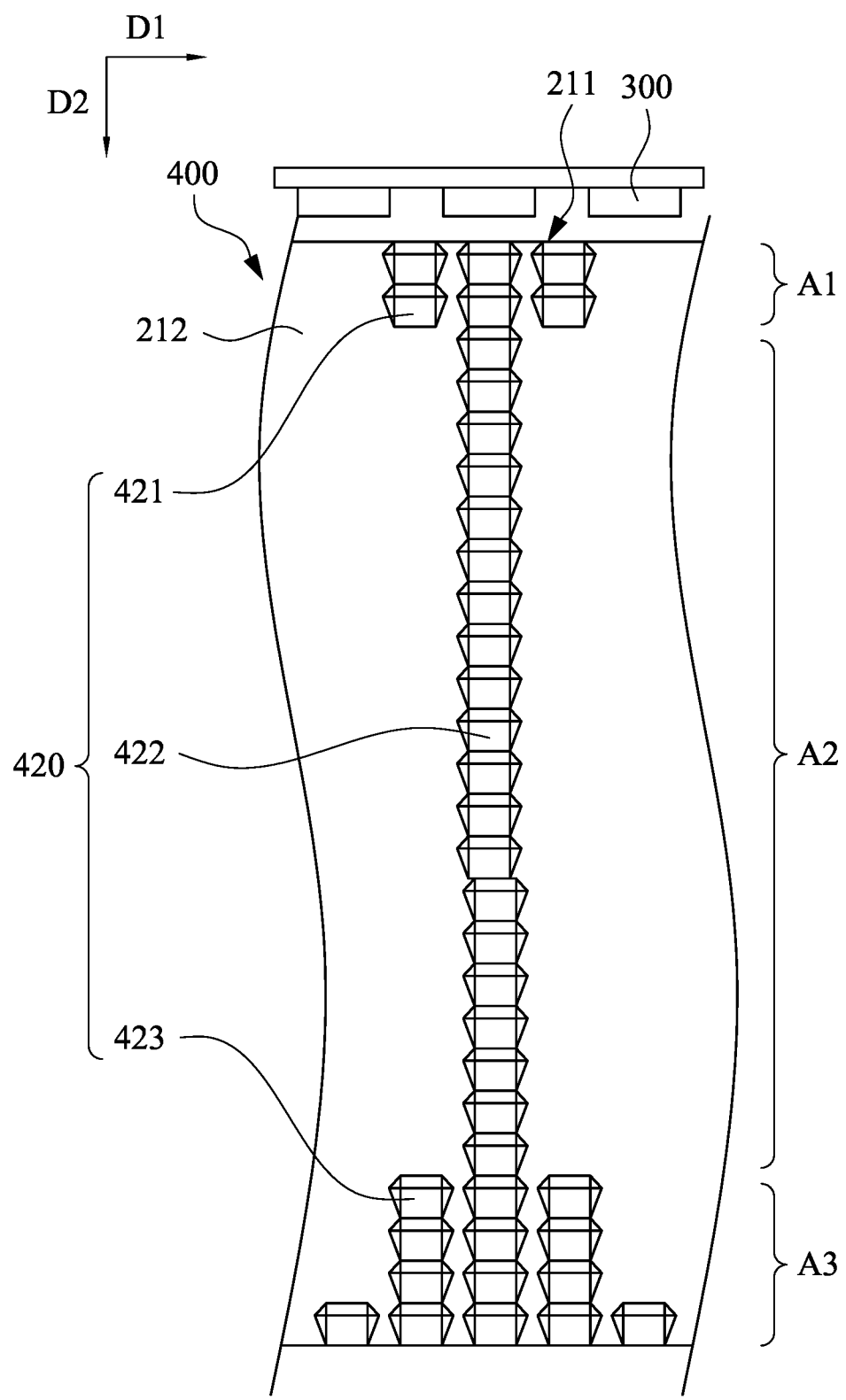
FIG. 3 is a schematic partial structural diagram showing a backlight module in accordance with a second embodiment of the present invention.

In other embodiments, the light guide plate may have different designs. Referring to FIG. 3, FIG. 3 is a schematic partial structural diagram showing a backlight module in accordance with a second embodiment of the present invention. In the present embodiment, the structure of a light guide plate 400 shown in FIG. 3 is similar to that of the light guide plate 200 in the aforementioned embodiment, and the main difference therebetween is that prism portions 420 of the light guide plate 400 have different designs. In the present embodiment, each of the prism portions 420 is formed from plural prism structures (such as prism structures 421, prism structures 422 and prism structures 423) arranged along the second extending direction D2. The prism structures 421 are located in the first region A1, the prism structures 422 are located in the second region A2, and the prism structures 423 are located in the third region A3.

As shown in FIG. 3, in one embodiment, sizes of the prism structures 421, the prism structures 422 and the prism structures 423 are substantially the same. Moreover, an arrangement density of the prism structures 421 located in the first region A1 is greater than an arrangement density of the prism structures 422 located in the second region A2 and is smaller than an arrangement density of the prism structures 423 in the third region A3, thereby forming an occupied area ratio of the prism structures 421 located in the first region A1 which is greater than an occupied area ratio of the prism structures 422 located in the second region A2 and is smaller than an occupied area ratio of the prism structures 423 located in the third region A3. Therefore, after light generated from the light source 300 enters the light guide plate 400 from the light-incident surface 211, the light emitted amount through the prism structures 421 located near the light-incident surface 211 is increased obviously, thereby overcoming the bright and dark band problem occurring at a light-incident side of the conventional light guide plate, thus enhancing the luminance uniformity of the optical surface 212 of the light guide plate 400.

It is noted that, the designs of the prism structures 421, the prism structures 422 and the prism structures 423 are similar to the design of the prism structures 222 as shown in FIG. 2A and FIG. 2B, and therefore will not be described again herein. On the other hand, sizes of the prism structures 421, the prism structures 422 and the prism structures 423 which are design to be equal is merely used as an example for explanation. In other embodiments, sizes of the prism structures 421, the prism structures 422 and the prism structures 423 can be designed to be different. For example, a width of each of the prism structures 421 is designed to be greater than a width of each of the prism structures 422 and is designed to be smaller than a width of each of the prism structures 423, thereby changing occupied area ratios of the prism portions 420 respectively located in the first region A1, the second region A2 and the third region A3, so as to control mounts of light respectively emitted from the first region A1, the second region A2 and the third region A3 of the light guide plate 400.

Figure 4A:
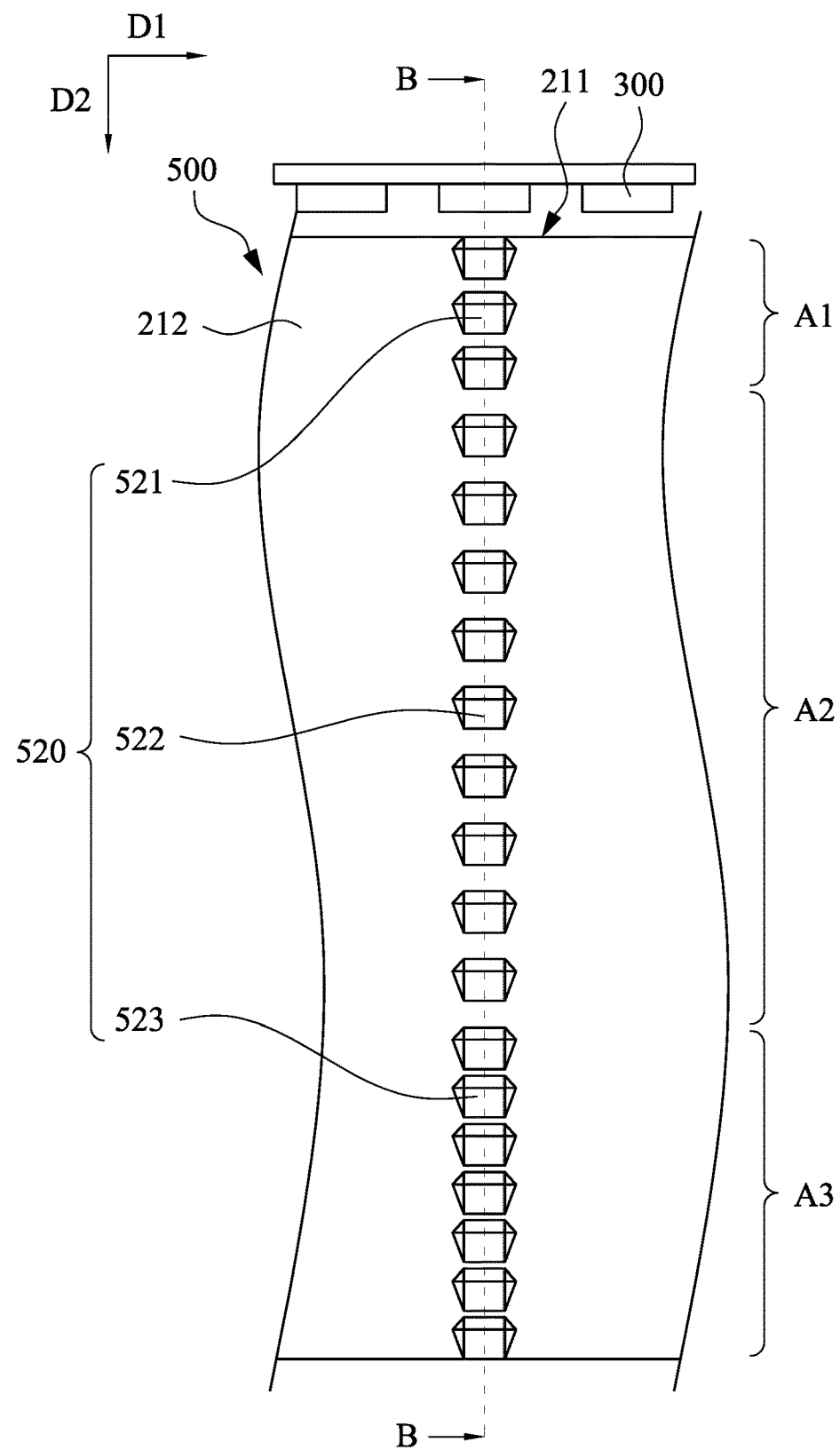
FIG. 4A is a schematic partial structural diagram showing a backlight module in accordance with a third embodiment of the present invention.
Figure 4B:
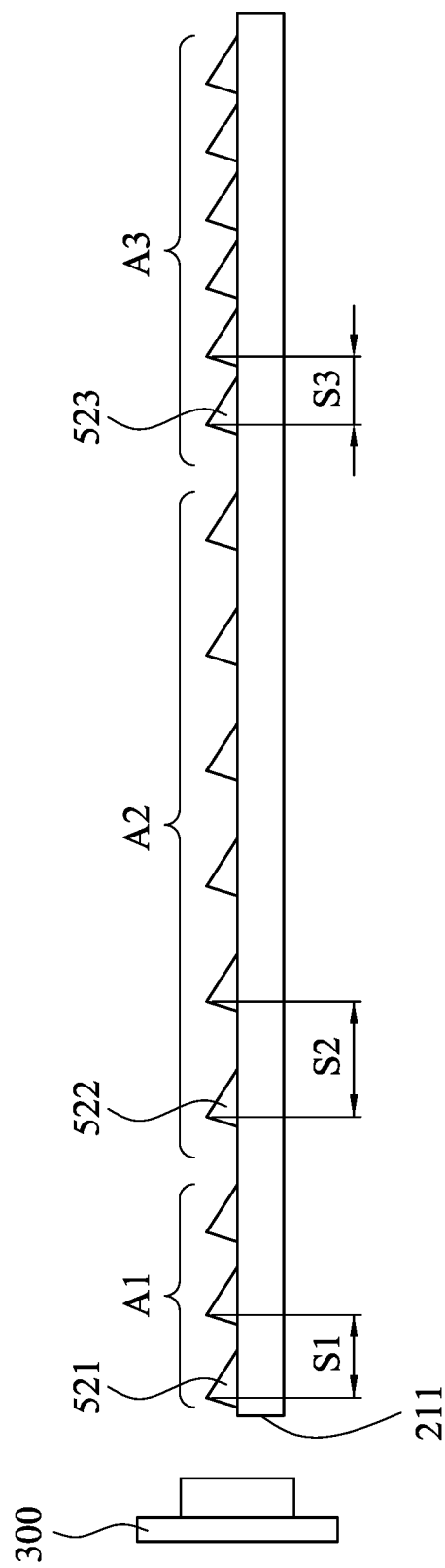
FIG. 4B is a schematic cross-sectional view taken along line B-B in FIG. 4A.

Simultaneously referring to FIG. 4A and FIG. 4B, FIG. 4A is a schematic partial structural diagram showing a backlight module in accordance with a third embodiment of the present invention, and FIG. 4B is a schematic cross-sectional view taken along line B-B in FIG. 4A. In the present embodiment, the structure of a light guide plate 500 shown in FIG. 4A and FIG. 4B is similar to that of the light guide plate 200 in the aforementioned embodiment, and the main difference therebetween is that prism portions 520 of the light guide plate 500 have different designs. In the present embodiment, each of the prism portions 520 is formed from plural prism structures (such as prism structures 521, prism structures 522 and prism structures 523) arranged along the second extending direction D2. The prism structures 521 are located in the first region A1, the prism structures 522 are located in the second region A2, and the prism structures 523 are located in the third region A3.

As shown in FIG. 4A and FIG. 4B, in one embodiment, sizes of the prism structures 521, the prism structures 522 and the prism structures 523 are substantially equal. There is a first distance S1 between any two adjacent prism structures 521 which are located in the first region A1 along the second extending direction D2, there is a second distance S2 between any two adjacent prism structures 522 which are located in the second region A2 along the second extending direction D2, and there is a third distance S3 between any two adjacent prism structures 522 which are located in the third region A3 along the second extending direction D2. The second distance S2 is greater than first distance S1, and the first distance S1 is greater than the third distance S3, thereby forming an occupied area ratio of the prism structures 521 located in the first region A1 which is greater than an occupied area ratio of the prism structures 522 located in the second region A2 and is smaller than an occupied area ratio of the prism structures 523 located in the third region A3. Therefore, after light generated from the light source 500 enters the light guide plate 500 from the light-incident surface 211, the light emitted amount through the prism structures 521 located near the light-incident surface 211 is increased obviously, thereby overcoming the bright and dark band problem occurring at a light-incident side of the conventional light guide plate, thus enhancing the luminance uniformity of the optical surface 212 of the light guide plate 500.

It is noted that, the designs of the prism structures 521, the prism structures 522 and the prism structures 523 are similar to the design of the prism structures 222 as shown in FIG. 2A and FIG. 2B, and therefore will not be described again herein. On the other hand, sizes of the prism structures 521, the prism structures 522 and the prism structures 523 which are design to be equal is merely used as an example for explanation. In other embodiments, sizes of the prism structures 521, the prism structures 522 and the prism structures 523 can be designed to be different. For example, a width of each of the prism structures 521 is greater than a width of each of the prism structures 522 and is smaller than a width of each of the prism structures 523, thereby changing occupied area ratios of the prism portions 520 respectively located in the first region A1, the second region A2 and the third region A3. In other embodiments, an arrangement density of the prism structures 521 located in the first region A1, an arrangement density of the prism structures 522 located in the second region A2 and an arrangement density of the prism structures 523 located in the third region A3 also can be varied to change occupied area ratios of the prism portions 520 respectively located in the first region A1, the second region A2 and the third region A3.

Figure 5:
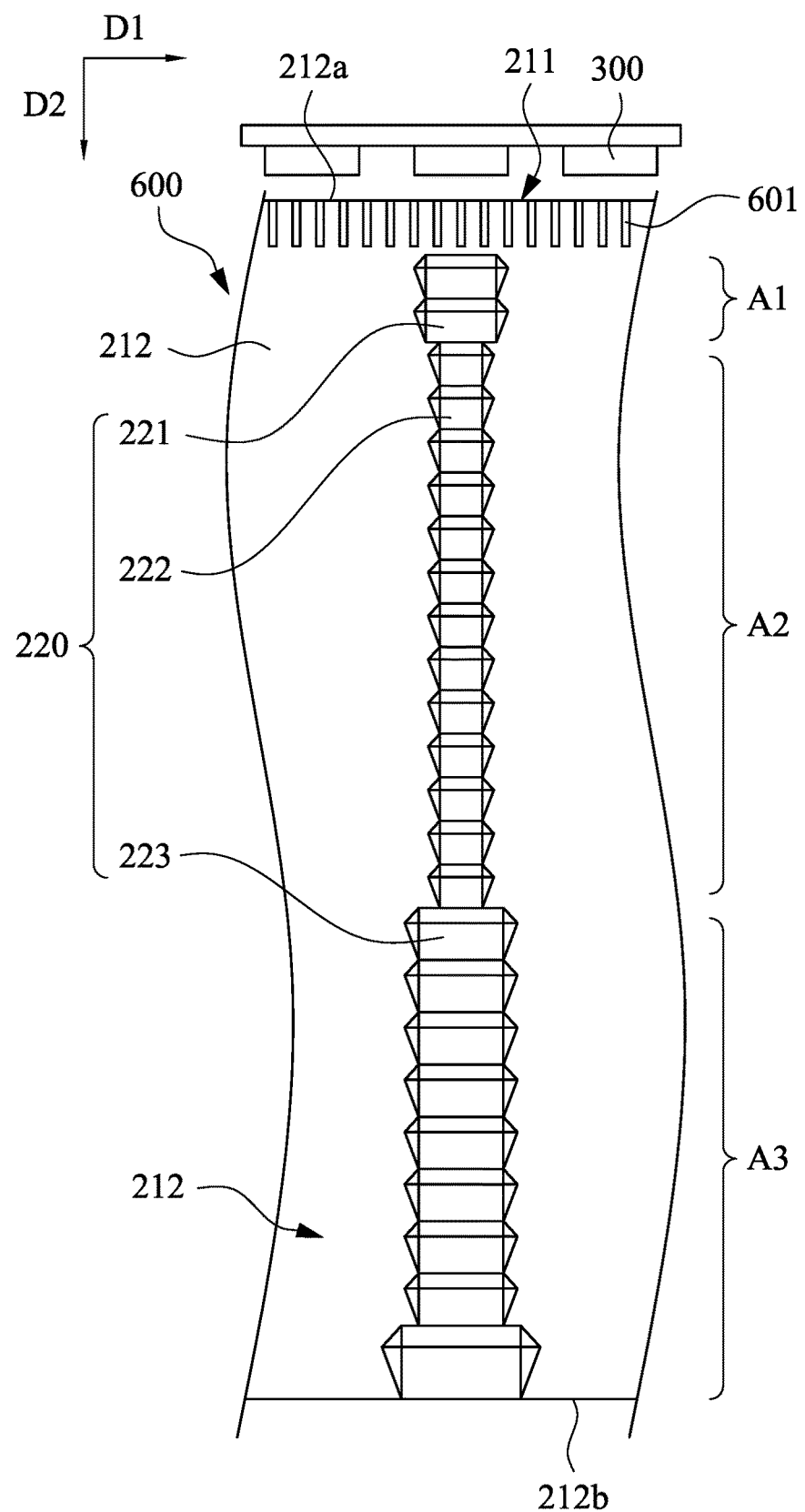
FIG. 5 is a schematic partial structural diagram showing a backlight module in accordance with a fourth embodiment of the present invention.

Referring to FIG. 5, FIG. 5 is a schematic partial structural diagram showing a backlight module in accordance with a fourth embodiment of the present invention. In the present embodiment, the structure of a light guide plate 600 shown in FIG. 5 is similar to that of the light guide plate 200 in the aforementioned embodiment, and the main difference therebetween is that the light guide plate 600 further includes plural light-mixing structures 601. As shown in FIG. 5, the light-mixing structures 601 are disposed on the optical surface 212 and are located between the light-incident surface 211 and the first region A1. In the present embodiment, the light-mixing structures 601 are striped structures, and each of the striped structures is a convex portion protruding from the optical surface 212, or is a concave portion recessed into the optical surface 212. Moreover, each of the light-mixing structures 601 extends along the second extending direction D2. Therefore, after being emitted from the light source 300 and entering the light guide plate 600, the light will pass through and be mixed by the light-mixing structures 601, such that the problems of non-uniform light appearance causing by the bright bands appearing on a light-incident side of the conventional light guide plate can be improved.

It is noted that, the light guide plate 600 having the light-mixing structures 601 and the prism portions 220 shown in FIG. 5 is merely used as an example for explanation. In other embodiments, light-mixing structures 601 also can be applied to the light guide plate 400 as shown in FIG. 3 to cooperate with the prism portions 420, or can be applied to the light guide plate 500 as shown in FIG. 4A and FIG. 4B to cooperate with prism portions 520, so as to achieve the same effect as mentioned before.

Figure 6:
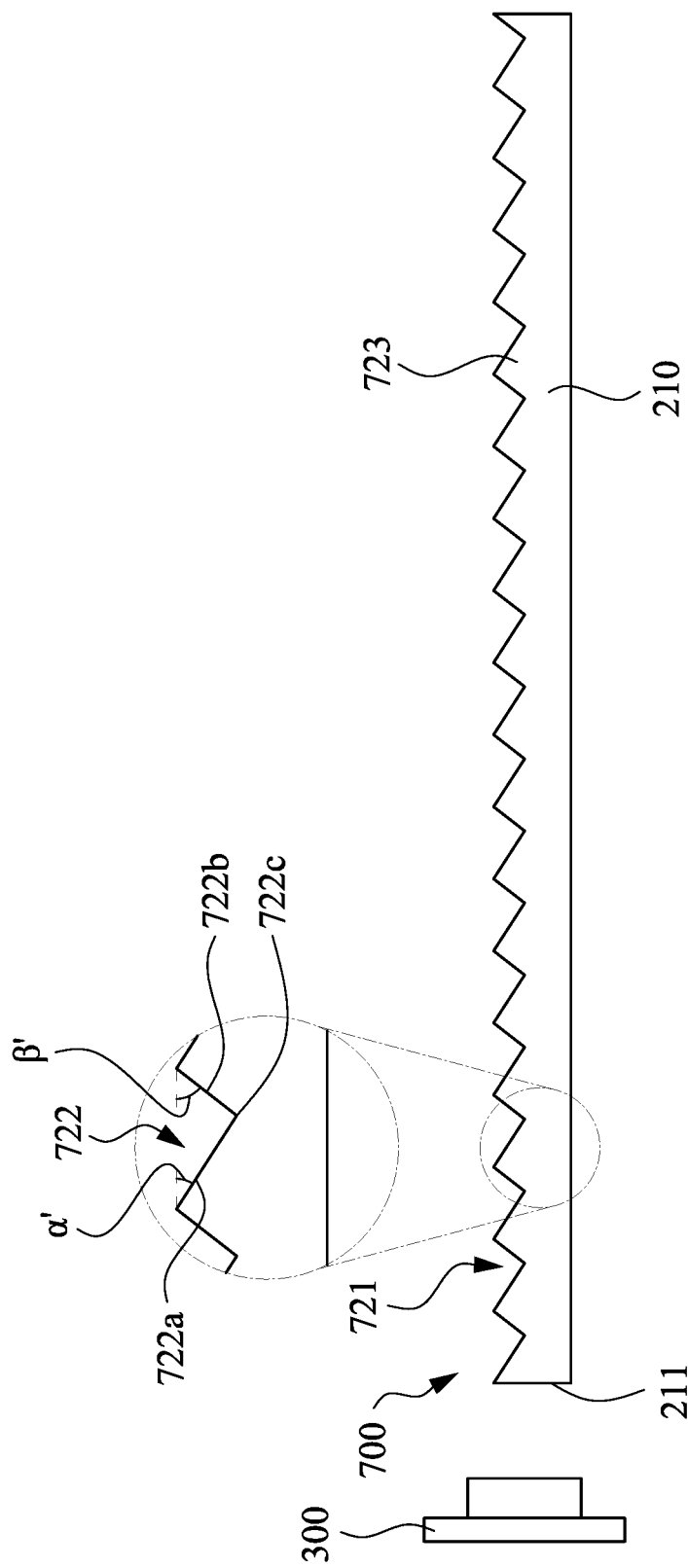
FIG. 6 is a schematic partial structural diagram showing a backlight module in accordance with a fifth embodiment of the present invention.

It is noted that, the prism structures which are convex portions is merely used as an example for explanation. In other embodiments, the prism structures can be concave structures. Referring to FIG. 6, FIG. 6 is a schematic partial structural diagram showing a backlight module in accordance with a fifth embodiment of the present invention. In the present embodiment, the structure of a light guide plate 700 shown in FIG. 6 is similar to that of the light guide plate 200 in the aforementioned embodiment, and the main difference therebetween is that prism structures 721, 722 and 723 have different structures. In the present embodiment, the prism structures 721, the prism structures 722 and the prism structures 723 are concave structures. In one example, each of the prism structures 722 has a first optical surface 722a and a second optical surface 722b, in which the first optical surface 722a is near the light-incident surface 211, and the second optical surface 722b is away from the light-incident surface 211. The first optical surface 722a is inclined with respect to the light-incident surface 211 and extends from a top portion to a bottom portion of each of the prism structures 722, in which a first inclined angle α' is formed between the first optical surface 722a and a level surface passing through a top portion of the first optical surface 722a. The second optical surface 722b is inclined with respect to the light-incident surface 211 and extends from the top portion to the bottom portion of each of the prism structures 722, in which a second inclined angle β' is formed between the second optical surface 722b and a level surface passing through a top portion of the second optical surface 722b. In some embodiments, the first inclined angle α' is smaller than the second inclined angle β'. The first optical surface 722a and the second optical surface 722b of each of the prism structures 722 are connected to form a valley line 722c, and the valley line 722c is substantially parallel to the light-incident surface 211. In the present embodiment, the first optical surface 722a and the second optical surface 722b are mainly used to change light-emitting direction of light emitted from the prism structures 722. It is noted that, the designs of the prism structures 721 and the prism structures 723 are similar to the design of the prism structures 722, and each of the prism structures 721 and the prism structures 723 also has a first optical surface and a second optical surface respectively inclined with respect to the light-incident surface 211 so as to achieve the objective of changing light directivity, and therefore will not be described again herein.

Simultaneously referring to FIG. 2B and FIG. 6, because the prism structures 221, 222 and 223 shown in FIG. 2B are convex portions, most of the light entering the light guide plate 200 from the light-incident surface 211 is emitted towards the second optical surface (such as second optical surface 222b). In other words, the second optical surface of each of the prism structures 221, 222 and 223 is a surface which receives light directly. Therefore, in some embodiments, for achieving the purpose of guiding light, the area of the second optical surface is greater than that of the first optical surface, so as to increase the light-emitting efficiency and the uniformity of the overall light-emitting appearance of the light guide plate 200. On the other hand, because the prism structures 721, 722 and 723 shown in FIG. 6 are concave portions, most of the light entering the light guide plate 700 from the light-incident surface 211 is emitted towards the first optical surface (such as first optical surface 722a). In other words, the first optical surface of each of the prism structures 721, 722 and 723 is a surface which receives light directly. Therefore, in the structural design, the area of the first optical surface of each of the prism structures 721, 722 and 723 is greater than that of the second optical surface of each of the prism structures 721, 722 and 723, so as to increase the light-emitting efficiency and the uniformity of the overall light-emitting appearance of the light guide plate 700.

Figure 7:
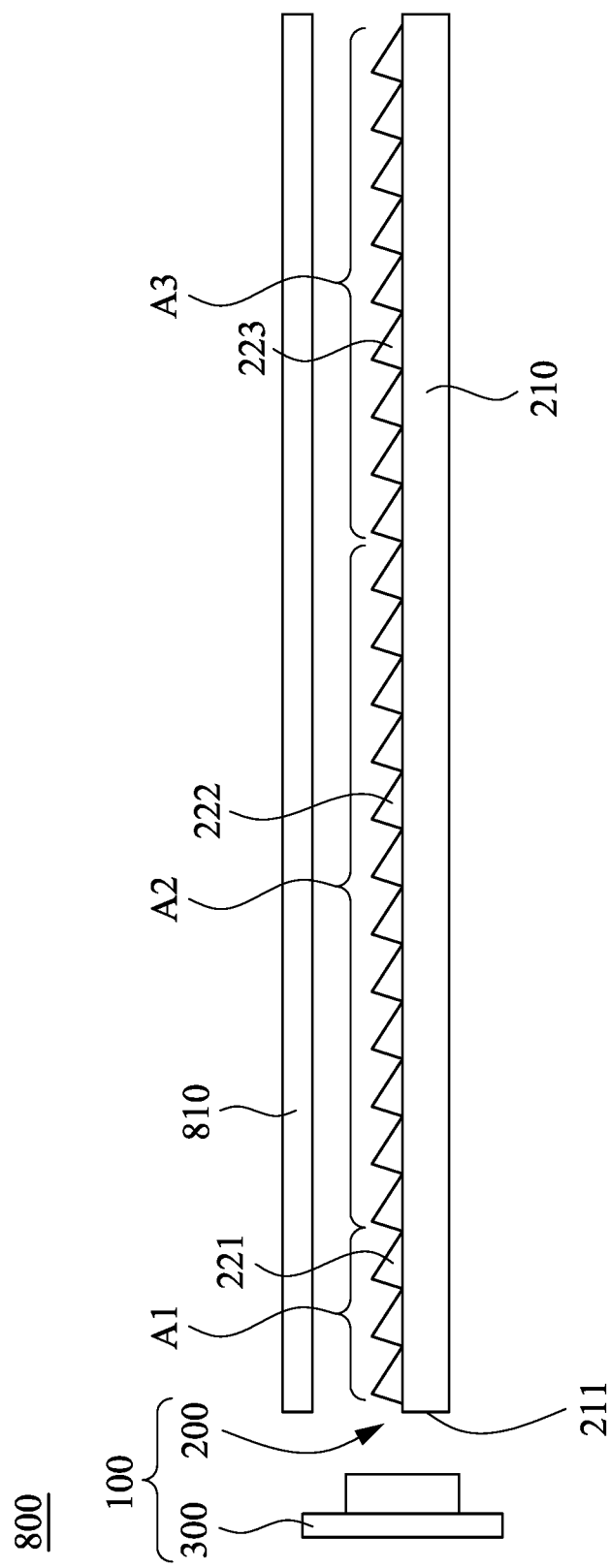
FIG. 7 is a schematic structural diagram showing a display device in accordance with an embodiment of the present invention.

Referring to FIG. 7, FIG. 7 is a schematic structural diagram showing a display device 800 in accordance with an embodiment of the present invention. The display device 800 of the present embodiment includes a backlight module 100 shown in FIG. 2A and FIG. 2B and a display panel 810. As shown in FIG. 7, the display panel 810 is disposed in front of the light guide plate 200 in the backlight module 100, so as to achieve the aforementioned effect. It is noted that, the light guide plate 200 of the backlight module 100 shown in FIG. 2A and FIG. 2B is merely used as an example applied to the display device 800 for explanation, and embodiments of the present invention are not limited thereto. In other embodiments, other backlight modules, such as backlight modules having the light guide plate 400, 500, 600 or 700 also can be applied to a display device, so as to achieve the same effect.

According to the aforementioned embodiments of the present invention, the light guide plate of the present invention has plural prism portions, in which occupied area ratio of the prism portions located near the light-incident surface of the light guide plate, located away from the light-incident surface (i.e. a surface opposite to the light-incident surface) of the light guide plate, and located at a middle portion of the light guide plate are different, such that the light emitted amounts from different positions of the light guide plate can be controlled, thus increasing the luminance uniformity of the light guide plate.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light guide plate, comprising:
a main body having a first extending direction and a second extending direction vertical to the first extending direction, wherein the main body comprises:
a light-incident surface extending along the first extending direction; and
an optical surface connected to the light-incident surface, wherein the optical surface has a first side edge near the light-incident surface and a second side edge away from the light-incident surface, wherein the second extending direction is parallel to a direction extending from the first side edge towards the second side edge, and the optical surface has a first region, a second region and a third region which are arranged along the second extending direction; and
a plurality of prism portions disposed on the optical surface, wherein each of the prism portions extends along the second extending direction;
wherein an occupied area ratio of a first portion of the prism portions located in the first region is greater than an occupied area ratio of a second portion of the prism portions located in the second region and is smaller than an occupied area ratio of a third portion of the prism portions located in the third region.

2. The light guide plate of claim 1, wherein
each of the prism portions has a first width located in the first region, a second width located in the second region and a third width located in the third region; and
the first width is greater than the second width, and the first width is smaller than the third width.

3. The light guide plate of claim 1, wherein
each of the prism portions is formed from a plurality of the prism structures arranged along the second extending direction;
each of the first portion of the prism structures located in the first region has a first width, each of the second portion of the prism structures located in the second region has a second width, and each of the third portion of the prism structures located in the third region has a third width; and
the first width is greater than the second width, and the first width is smaller than the third width.

4. The light guide plate of claim 1, wherein
each of the prism portions is formed from a plurality of the prism structures arranged along the second extending direction; and
an arrangement density of the prism structures which are located in the first region is greater than an arrangement density of the prism structures which are located in the second region and is smaller than an arrangement density of the prism structures which are located in the third region.

5. The light guide plate of claim 1, wherein
each of the prism portions is formed from a plurality of the prism structures arranged along the second extending direction;
there is a first distance between any two adjacent prism structures which are located in the first region along the second extending direction, there is a second distance between any two adjacent prism structures which are located in the second region along the second extending direction, and there is a third distance between any two adjacent prism structures which are located in the third region along the second extending direction; and
the second distance is greater than the first distance, and the first distance is greater than the third distance.

6. The light guide plate of claim 1, wherein
each of the prism portions is formed from a plurality of the prism structures arranged along the second extending direction; and
the prism structures are continuously connected together.

7. The light guide plate of claim 1, further comprising a plurality of light-mixing structures disposed on the optical surface, wherein the light-mixing structures are located between the first side edge and the first region.

8. The light guide plate of claim 1, wherein
each of the prism portions is formed from a plurality of the prism structures arranged along the second extending direction;
each of the prism structures comprises:
a first optical surface inclined towards the light-incident surface, wherein the first optical surface extends from a bottom portion to a top portion of each of the prism structures, and a first inclined angle is included between the first optical surface and a level surface passing through a bottom portion of the first optical surface;
a second optical surface inclined towards the light-incident surface, wherein the second optical surface extends from the bottom portion to the top portion of each of the prism structures, and a second inclined angle is included between the second optical surface and a level surface passing through a bottom portion of the second optical surface;
wherein the first optical surface is near the light-incident surface, and the second optical surface is away from the light-incident surface.

9. The light guide plate of claim 8, wherein the first optical surface and the second optical surface of each of the prism structures are connected to form a ridge line which is substantially parallel to the first side edge.

10. The light guide plate of claim 1, wherein
each of the prism portions is formed from a plurality of the prism structures arranged along the second extending direction;
each of the prism structures comprises:
a first optical surface inclined towards the light-incident surface, wherein the first optical surface extends from a top portion to a bottom portion of each of the prism structures, and a first inclined angle is included between the first optical surface and a level surface passing through a top portion of the first optical surface;
a second optical surface inclined towards the light-incident surface, wherein the second optical surface extends from the top portion to the bottom portion of each of the prism structures, and a second inclined angle is included between the second optical surface and a level surface passing through a top portion of the second optical surface;
wherein the first optical surface is near the light-incident surface, and the second optical surface is away from the light-incident surface.

11. The light guide plate of claim 10, wherein the first optical surface and the second optical surface of each of the prism structures are connected to form a valley line which is substantially parallel to the first side edge.

12. A backlight module, comprising:
a light guide plate as claimed in claim 1; and a light source disposed adjacent to the light-incident surface of the light guide plate.

13. A display device, comprising:
a backlight module as claimed in claim 12, and
a display panel disposed in front of the backlight module.

* * * * *